US008139599B2

(12) United States Patent
Shvodian et al.

(10) Patent No.: US 8,139,599 B2
(45) Date of Patent: Mar. 20, 2012

(54) SYSTEM AND METHOD FOR OPERATING A COMMUNICATIONS SYSTEM

(75) Inventors: William M. Shvodian, McLean, VA (US); Joel Z. Apisdorf, Reston, VA (US); Matthew L. Welborn, Vienna, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 615 days.

(21) Appl. No.: 11/785,610

(22) Filed: Apr. 19, 2007

(65) Prior Publication Data

US 2008/0259948 A1    Oct. 23, 2008

(51) Int. Cl.
*H04L 12/413* (2006.01)
(52) U.S. Cl. ........ 370/445; 370/431; 370/447; 455/403; 455/422.1
(58) Field of Classification Search .................. 370/431, 370/445, 447; 455/403, 422.1
See application file for complete search history.

(56) References Cited

U.S. PATENT DOCUMENTS

| | | | | |
|---|---|---|---|---|
| 3,935,535 A | * | 1/1976 | Motley et al. .................. 375/231 |
| 5,793,307 A | * | 8/1998 | Perreault et al. ............... 370/451 |
| 5,896,561 A | * | 4/1999 | Schrader et al. ............ 455/67.11 |
| 5,918,170 A | * | 6/1999 | Oksanen et al. ............ 455/343.4 |
| 6,091,741 A | * | 7/2000 | Fujiwara et al. .............. 370/465 |
| 2004/0205105 A1 | * | 10/2004 | Larsson et al. ................ 709/200 |
| 2004/0218556 A1 | * | 11/2004 | Son et al. ....................... 370/311 |
| 2005/0288738 A1 | * | 12/2005 | Bange et al. .................... 607/60 |

OTHER PUBLICATIONS

Ferrari, Gianluigi, "MAC Protocols and Transport Capacity in Ad Hoc Wireless Networks: Aloha versus PR-CSMA", Militar Communications Conference, 2003. MILCOM 2003. IEEE, Oct. 2003.*
"Part 11: Wireless LAN Medium Access control (MAC) and Physical Layer (PHY) specifications, High-speed Physical Layer in the 5GHz Band," *Supplement to IEEE Standard for Information Technology*, IEEE Std 802.11a-1999(R2003), Jun. 12, 2003.

* cited by examiner

*Primary Examiner* — Hassan Kizou
*Assistant Examiner* — Siming Liu

(57) ABSTRACT

A method (500, 600) is provided of operating a local transceiver (300), comprising: setting the local transceiver into an operational mode; operating the local transceiver in a polling mode (520); receiving a quiescent begin indicator identifying a beginning of a quiescent mode (520); setting a portion of the local transceiver into a low power consumption mode in response to the quiescent begin indicator (540); measuring an elapsed time since receiving the quiescent begin indicator as a quiescent time (530, 550); and returning the portion of the local transceiver to the operational mode based on a quiescent end indicator 550, 580, 690).

10 Claims, 4 Drawing Sheets

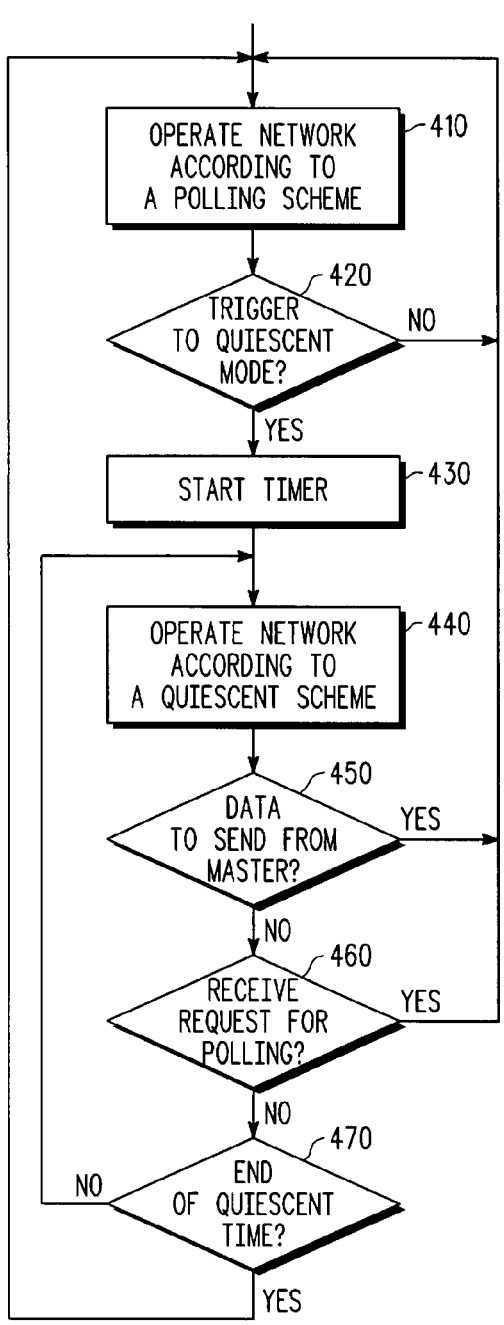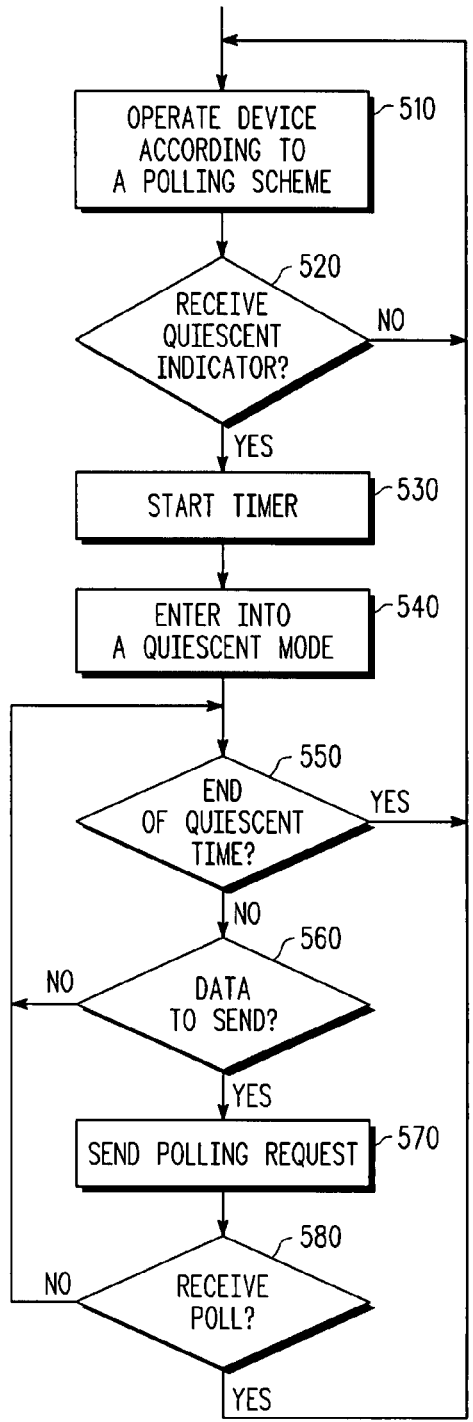
FIG. 4
FIG. 5

SYSTEM AND METHOD FOR OPERATING A COMMUNICATIONS SYSTEM

FIELD OF THE INVENTION

The present invention relates in general to a system and method for operating a communications network that allows for a temporary quiescent period to save power and reduce unnecessary interference on a communications channel.

BACKGROUND OF THE INVENTION

In any network in which devices share a single transmission channel (e.g., a wireless network, a shared bus network, etc.), every device can hear all or most of the other devices. In such a network when two devices transmit a signal at the same time, the two transmitted signals are considered to have collided, which can cause those signals to become unintelligible, meaning no data is sent, and thus the use of the transmission medium (i.e., the transmission channel) is lost for a time. Both signals will then have to be resent, lowering the data throughput of the network. If this happens often enough, the entire transmission medium could be rendered ineffective. It's therefore typically desirable to avoid, or at least minimize, such collisions.

One way to accomplish this is to accept the existence of collisions and try and minimize their occurrence or their effect through the use of a collision-based protocol. A collision-based protocol allows multiple devices to transmit data when they need to without any prearrangement. For example, an ALOHA protocol allows each device to transmit data when it wishes without monitoring the channel at all. In this protocol, fatal collisions simply prompt a retransmission. This results in comparatively higher collision rates and reduced efficiency as more transmissions must be resent. A slotted ALOHA protocol further refines the idea by dividing the available transmission time up into discrete time slots. It uses an ALOHA protocol within those time slots, but only allows each device to start a transmission at the beginning of one of the time slots. Thus, if no collision occurs immediately, it won't happen at all. And a carrier sense multiple access (CSMA) protocol requires a potential transmitting device to listen to the transmission channel prior to transmitting, and only allows it to transmit if it hears no one else transmitting (i.e., only if the transmission channel is clear).

Another way to reduce or eliminate collisions is to use a time division multiple access (TDMA) protocol, in which a network coordinator (or master device) restricts the use of the channel to one network device (or slave device) at any given time. A time slotting TDMA protocol divides the available transmission time up into discrete time slots and assigns them to individual devices or device pairs. Each device can only transmit in its allotted time, but knows that it won't have a collision with another device. A polling TDMA protocol does not assign specific time slots to each device, but rather has a network coordinator periodically poll each device in the network to see if it has data to send. The network coordinator can then assign channel time to each device based on its response to the poll.

A polling protocol allows great flexibility in allocating the available channel time. However, it incurs an overhead cost in that the network coordinator must repeatedly poll each device in the network to see if they have data to send. This can be particularly wasteful if no device in the network has any data to send. In such a case, the network coordinator will continually transmit polling signals, and the devices will repeatedly have to respond, when neither side has anything new to say.

A polling protocol can therefore create unnecessary signal traffic on a limited transmission medium that may well be shared with other networks. For example a wireless network may operate proximate to other wireless networks. Concurrent transmission in each network may require the networks to take steps that increase signal quality at the cost of transmission speed. This may be acceptable when each network is transmitting data, but is wasteful when one network is simply transmitting unnecessary polling signals.

In addition, a polling protocol forces power-limited devices to keep their receivers on for extended periods of time, listening for polling signals even when no one in the network has any data to send. This can cause unnecessary drain on battery power, and can be particularly bad in devices in which the receiver circuitry represents a significant portion of the power consumption of the device. For example, ultra-wide bandwidth devices typically have complex and power-hungry receivers that employ a large amount of signal processing because the transmission signals are below the noise floor. Such devices experience significant power drain any time their receiver is turned on.

It is therefore desirable to provide a system and method for data transmission in a communications network in which collisions can be minimized, but in which unnecessary transmissions by a network coordinator are also minimized.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

FIG. 4 is a flow chart of the operation of a network coordinator according to disclosed embodiments;

FIG. 5 is a flow chart of the operation of a network device according to disclosed embodiments in which polling requests are allowed during a quiescent mode.

DETAILED DESCRIPTION

The current disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best implemented in integrated circuits (ICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs, if any, will be limited to the essentials with respect to the principles and concepts used by the exemplary embodiments.

Polling and Quiescent Operation

One way to minimize both collisions and unnecessary transmissions by a network coordinator is to provide a polling protocol in which TDMA polling is performed during a polling mode, but can be stopped for a period of time during a quiescent mode. This allows the network to reduce or eliminate collisions by using the polling mode when the devices in the network have data to send, but then to reduce unnecessary transmissions and power consumption by using the quiescent mode when the network has little or no network traffic to send. In order to provide adequate control for the quiescent mode, a timer can be used to provide coordination between a network coordinator and devices in the network.

Figure 1:
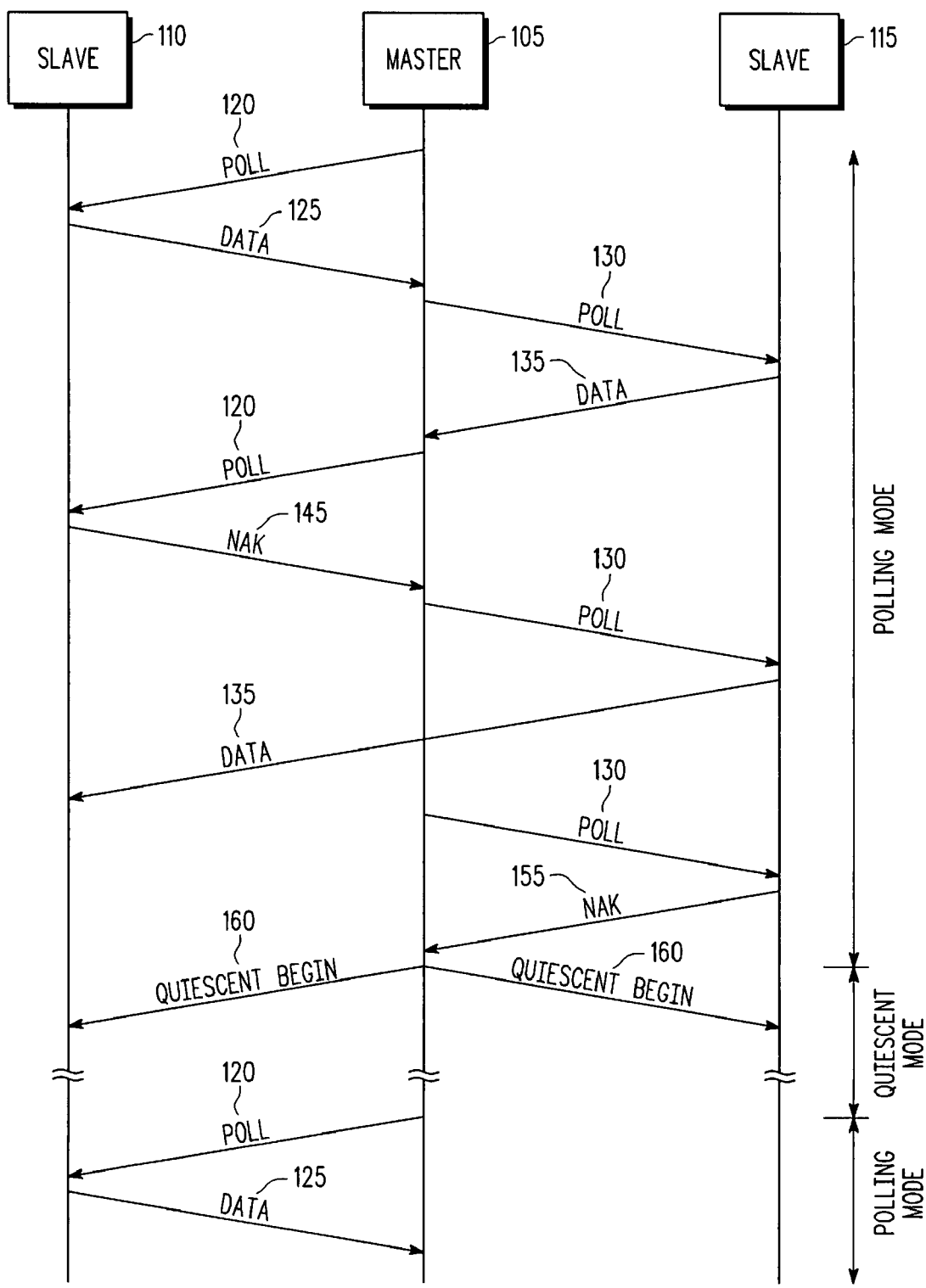
FIG. 1 is a message sequence chart of a communications network entering a quiescent mode according to disclosed embodiments.

FIG. 1 is a message sequence chart of a communications network entering a quiescent mode according to disclosed embodiments. As shown in FIG. 1, operation begins in a polling mode when a master device 105 (i.e., a network coordinator or network controller) sends a polling signal 120 to a slave device 110 (i.e., a non-coordinating device in the network).

The slave device 110 then responds by sending a data signal 125, since it has data to send. In this example, the data signal 125 is sent to the master device 105. However once the polling signal 120 is given, the slave device 110 would typically be allowed to send its data signal 125 to any device in the network. In some embodiments the slave device 110 may also pass some queue data to the master device 105 (e.g., indicating the type of data it has to send, how much total data it has to transmit, etc.).

After the slave device 110 is finished with its data transmission 125, the master device 105 then sends a polling signal 130 to the slave device 115 to see if it has data to send. In this example, the slave device 115 responds to the polling signal 130 by sending a data signal 135 to the master device 105. Again, the slave device 115 would typically be allowed to send its data signal to any device in the network, and may also pass some queue data to the master device 105.

The master device 105 then continues the polling mode by again sending a polling signal 120 to the slave device 110. In this case, however, the slave device 110 has no data to send. Therefore, instead of sending a data signal to a target device, it sends a null acknowledgement (NAK) signal 145 to the master device 105 indicating that it has no data to send. In some embodiments this NAK signal 145 can also provide an indication of how long the slave device 110 expects to not have data.

After receiving the NAK 145 from the slave device 115, the master device 105 continues the polling mode by again sending a polling signal 130 to the slave device 115. In this case, the slave device 115 sends a data signal 135 to the slave device 110.

The master device 105 then continues the polling mode by sending another polling signal 120 to the slave device 110. And this time the slave device 115 has no additional data to send, so it sends a NAK signal 155 to the master device 105 indicating no data to send.

At this point the master device 105 knows that there is no data to be transmitted in the network, and so sends a broadcast shutdown signal 160 to all of the slave devices 110, 115 indicating they should enter into a quiescent mode. This quiescent mode will last at most for a certain period of time (i.e., a quiescent time), and ends when the master device 105 sends a new polling signal 120 to the slave device 110.

During the course of the polling mode, the master device 105 repeatedly polls each of the devices in the network. In some embodiments it can be an even polling scheme in which each device is polled equally. In other embodiments it can be an uneven polling scheme in which some devices are polled more often than others. In some embodiments the master device 105 may base the polling frequency of each network device on information it knows regarding each device (e.g., the streaming nature of data sent from each device, information it receives from the devices regarding how big their transmit queues are, etc.)

Although not shown in FIG. 1, if the master device 105 is also a network device, it can also allocate channel time for itself. However, since the master device 105 coordinates the channel time, there is no need for it to send itself a separate polling signal. Rather, it can simply transmit data to another device during its assigned portion of the channel time.

Furthermore, although in the embodiment of FIG. 1, a NAK signal 145, 155 is used to indicate no data to send, alternate embodiments can use other signal types to indicate that a slave device 110, 115 has no data to send.

In addition, while in the example of FIG. 1, the master device 105 stopped polling each slave device 110, 115 after they indicated once they had no data, alternate embodiments can require a slave device 110, 115 to respond multiple times that it has no data before the master device 105 will consider it ready for a quiescent mode. Alternatively, the master device 105 could base this decision on queue information received from each slave device 110, 115.

Although in FIG. 1, every polling signal 120, 130 receives a response of some kind from one of the slave devices 110, 115, it is possible that in some cases the master device 105 will not receive a response. For example, a slave device 110, 115 might be shut off, have left the area of the network, or simply not hear the polling signal 120, 130. The master device 105 may be configured to wait only a set time-out period before considering the polling signal a failure and proceeding to the next slave device.

As shown in FIG. 1, during operation, the network can shift between poling and quiescent modes (or states). The various devices 105, 110, and 115 control their state of operation through the use of mode-changing triggers.

Figure 2:
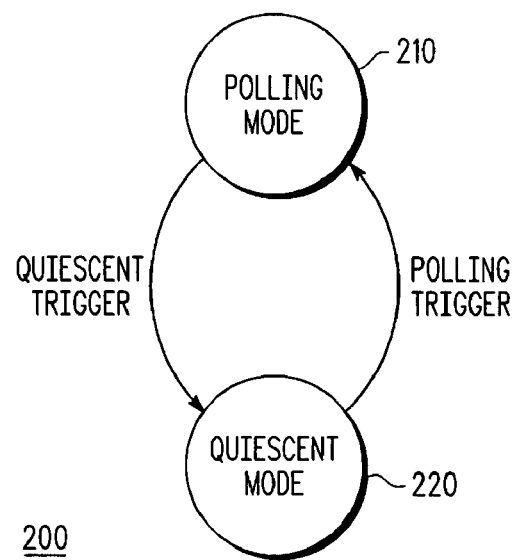
FIG. 2 is a state diagram of network operation according to disclosed embodiments.

FIG. 2 is a state diagram of network operation according to disclosed embodiments. As shown in FIG. 2, the network operates in one of two modes, a polling mode 210 and a quiescent mode 220.

In the polling mode 210, a network coordinator (e.g., a master device 105) repeatedly sends polling signals 120, 130 to devices in the network (e.g., slave device 110, 115), who only transmit data in response to the polling signals.

In the quiescent mode 220, the network coordinator does not send any polling signals 120, 130, and one or more of the devices in the network may enter into a power-saving mode.

The network transitions from the polling mode 210 to the quiescent mode 220 based on a quiescent trigger. The quiescent trigger for the network coordinator may be each device responding with a NAK a certain number of times in a row (which number may be one), each device specifically indicating within a response to the network coordinator that it has no data to send, or any other suitable indicator. Alternate embodiments can also have the quiescent trigger be some external signal. For example, the quiescent trigger may be a request from a co-located network that wishes to have the channel cleared for a certain period of time. Under certain circumstances (e.g., when the network has little or no data to send, or at least no time-critical data to send), the network may accept such an external request as a quiescent trigger.

The quiescent trigger (or indicator) for the network devices will typically be a signal from the network coordinator indicating entry into the quiescent mode. However in some embodiments a network device may consider it a valid quiescent indicator if it goes a certain period of time without receiving a polling signal. In such an embodiment the network coordinator does not have to specifically send a broadcast shut-down signal 160, but can simply stop sending polling requests.

The network transitions from the quiescent mode 220 to the polling mode 210 based on a polling trigger. For the network coordinator, this polling trigger may be the passing of a certain amount of time in the quiescent mode, the receipt by the network coordinator of a polling request from one of the devices in the network, a need on the part of the network coordinator to send data to a device in the network, or any other suitable indicator. For a network device, this polling trigger may be the passing of a certain amount of time in the quiescent mode, or the receipt by the network device of a polling signal from the network coordinator.

Network Transceiver

Figure 3:
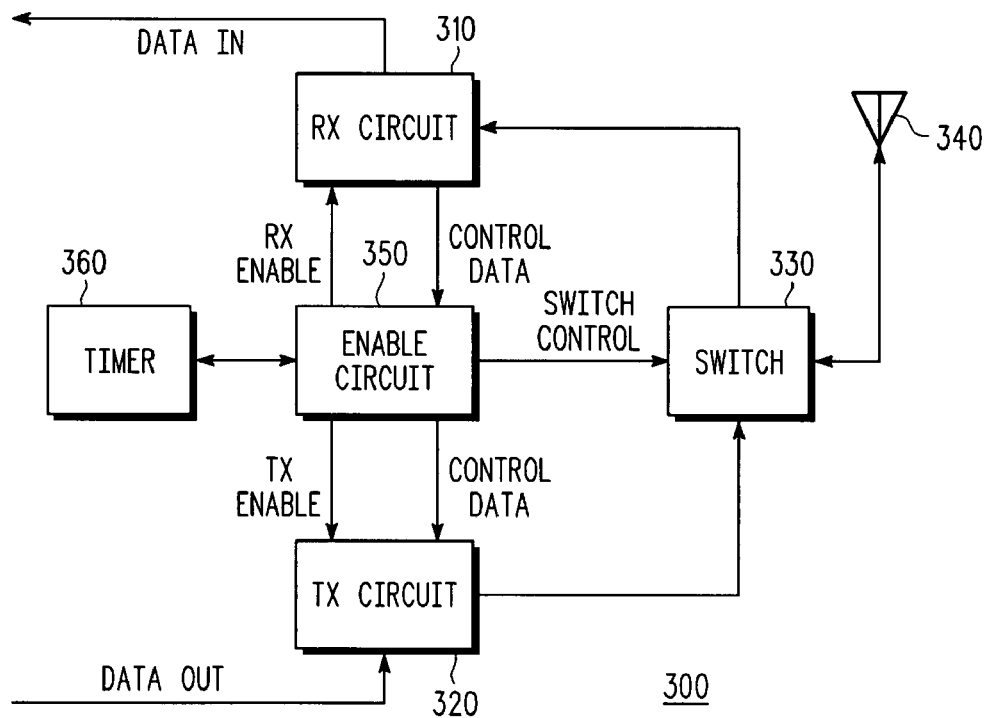
FIG. 3 is a block diagram of a network transceiver according to disclosed embodiments of the present invention.

FIG. 3 is a block diagram of a network transceiver according to disclosed embodiments of the present invention. As shown in FIG. 3, the transceiver 300 includes a receiver circuit 310, a transmitter circuit 320, a switch 330, an antenna 340, an enable circuit 350, and a timer 360.

The receiver circuit 310 receives incoming signals from the antenna 340 and extracts information from the incoming signals, including control data and data in. The receiver circuit 310 passes the control data to the enable circuit 350, and the data in to additional circuitry (not shown) connected to the transceiver 300.

The transmitter circuit 320 sends outgoing signals to the antenna 340 for transmission, embedding control data and data out into these outgoing signals. The transmitter circuit 320 receives the control data from the enable circuit 350, and the data out from additional circuitry (not shown) connected to the transceiver 300.

The switch 330 is placed between the antenna 340, the receiver circuit 310, and the transmitter circuit 320, and is configured to connect one of the receiver circuit 310 and the transmitter circuit 320 to the antenna based on switch control signals received from the enable circuit 350. Alternate embodiments can eliminate the switch 330, however. In some cases the transceiver 300 can use alternate means to isolate the receiver circuit 310 and the transmitter circuit 320; in others it may not be necessary to isolate the receiver circuit 310 and the transmitter circuit 320 at all.

The antenna 340 is configured to send and receive signals using whatever transmission scheme is appropriate to the transceiver 300. It is connected to the receiver circuit 310 and the transmitter circuit 320, either directly or through the switch 330.

The enable circuit 350 receives control data from the receiver circuit 310 that is extracted from the incoming signals, provides control data to the transmitter circuit 320 for transmission in outgoing signals, provides the transmitter and receiver enable signals to the receiver circuit 310 and the transmitter circuit 320, provides a switch control signal to the switch 330, and coordinates the operation of the timer 360. The enable circuit 350 also monitors the various signals it receives for the polling and quiescent triggers.

The timer 360 is used by the enable circuit to mark the passage of the quiescent time. This can be implemented as any suitable form of time-keeping circuit that can mark the passage of a specific period of time.

During a polling mode, the receiver circuit 310 extracts polling information from incoming polling signals and provides them to the enable circuit 350 via the control data. The enable circuit 350 then monitors the polling information and controls the operation of the receiver circuit 310 and the transmitter circuit 320 accordingly.

During a quiescent mode, the enable circuit 350 monitors the quiescent mode's duration via the timer 360. The enable circuit may also instruct the receiver circuit 310 and/or the transmitter circuit 320 to go into a low-power mode (or even shut down) for some or all of the quiescent mode.

In some embodiments, the quiescent mode may allow data to be transmitted within the network via another protocol (e.g., a contention-based protocol), or may allow network devices to request that the network coordinator end the quiescent mode before the end of the quiescent time. In this case, the enable circuit may also continue to monitor the control data from the transmitter circuit 320, indicating any data out that needs to be transmitted. In some embodiments in which the receiver circuit 310 is not powered down, the enable circuit may also continue to monitor the control data from the receiver circuit 310, to see if any data in has been received during the quiescent mode.

Although FIG. 3 discloses a wireless transceiver 300, this is by way of example only. In alternate embodiments the transceiver 300 could be a wired transceiver, using copper or fiberoptic wires. In such an embodiment the antenna 340 can either be removed or replaced with an appropriate wired interface element. Furthermore, the wireless transceiver 300 could be an RF wireless system, an optical free space system, or any other appropriate wireless system.

In particular, a transceiver is provided, comprising: a transmitter circuit configured to transmit outgoing data signals in a communications network; a receiver circuit configured to receive incoming data signals in the communications network; a timer configured to measure an elapsed time of a quiescent mode; and an enable circuit configured to control operation of the transmitter circuit and the receiver circuit, and to place the receiver circuit in a low power mode during a quiescent mode, wherein the enable circuit uses the elapsed time to determine when the transceiver is in the quiescent mode.

The transceiver may further comprise an antenna connected to the transmitter circuit and the receiver circuit, and configured to transmit the outgoing data signals over a wireless transmission medium, and to receive the incoming data signals from the wireless transmission medium. In this case, the transceiver may further comprise a switch configured to connect the antenna to one of the transmitter circuit and the receiver circuit based on a switch control signal received from the enable circuit.

The transceiver may be implemented in a semiconductor device.

Method of Operating a Network Coordinator

FIG. 4 is a flow chart of the operation of a network coordinator according to disclosed embodiments. As shown in FIG. 4, the network coordinator begins by operating according to a polling scheme or polling protocol (410).

During this polling mode the network coordinator continually or periodically looks for a quiescent begin trigger indicating an entry into a quiescent mode (420). The quiescent begin trigger could be receiving indications from all devices in the communications network that there is no data to be transmitted, e.g, passing through a set number of polling cycles without any data being sent. The quiescent begin trigger could also be receiving specific queue information from all the devices in the communications network that there is a certain minimum amount of data, none of which is time-critical, e.g., via queue information sent in a NAK signal. The quiescent begin trigger could also be receiving a request for quiescent mode from a source external to the communications network. For example, an adjacent network might make a request to the network coordinator that it enter a quiescent mode for a time so that the adjacent network can more easily or quickly send some critical information. If the communications network did not have any critical data of its own to send, it might accept the external request in order to be a good neighbor.

If the network coordinator does not receive the trigger to enter the quiescent mode (420), it returns to operating according to the polling scheme (410), and monitoring for the quiescent mode trigger (420).

However, if the network coordinator does receive the trigger to enter the quiescent mode (420), it starts a timer (430) and begins to operate the network according to a quiescent scheme or a quiescent protocol (440). The quiescent scheme could be a total shutdown of the network, a change to a different transmission protocol (e.g., a contention-based protocol such as ALOHA, slotted ALOHA, carrier sense multiple access, IEEE 802.11 type, or the like), or a partial shutdown with some transmissions allowed under a different protocol.

In some embodiments it may be permissible for the network coordinator to return the network to the polling scheme if it has data to send to a network device. In such a case, the network coordinator continually or periodically determines whether it has data to send to a device in the network (450). If the network coordinator does have data to send to a network device, it returns to the polling mode and again operates the network according to a polling scheme (410). If, however, the network device has no data to send, processing continues in the quiescent mode.

In some embodiments the network coordinator may maintain information regarding which network devices continue to listen for signals during the quiescent mode. In this case, the network coordinator may also make a further determination regarding whether a target device for the data is listening or not. In this case, the network coordinator will only return to the polling mode (410) if the device will be listening.

In some alternate embodiments, however, it will not be permissible for the network coordinator to exit the quiescent mode simply because it has data to send to a network device. In such a case, this operation (450) can be eliminated.

In some embodiments it may be permissible for the network coordinator to return the network to the polling scheme if it receives a polling request by a network device during the quiescent mode. In such a case, the network coordinator continually or periodically determines whether it has received a polling request from any of the network devices (460). If the network coordinator has received such a polling request, it returns to the polling mode and again operates the network according to a polling scheme (410). If, however, the network device has received no polling request, processing continues in the quiescent mode. This operation (460) can be eliminated in some alternate embodiments in which the network coordinator cannot end the quiescent period early.

In many embodiments the elapsing of a set time period in the quiescent mode will represent a maximum length of the quiescent mode. This will allow devices that do enter a low-power mode to know when to return to a polling mode without having to receive any external signals. In such an embodiment, the network coordinator continually or periodically determines whether it the quiescent mode has lasted for the entire quiescent time yet. (470). If it determines that the quiescent time has ended, the network coordinator returns to the polling mode and again operates the network according to a polling scheme (410). If, however, the network coordinator determines that the quiescent time has not ended, it continues to operate the network in the quiescent mode (440).

In one exemplary embodiment the maximum quiescent time may be in the range of 20-100 millisecond. However, this is simply by way of example, the maximum quiescent time can vary widely by embodiment, and may be chosen based on any number of network parameters.

In addition, in some embodiments the timing of the quiescent period (operations 430 and 460) may be eliminated altogether. For example, in a network in which no device enters a power conservation state during the quiescent mode, the quiescent mode might last until either the network coordinator or one of the network devices requested that it end.

In the embodiments of FIG. 4, operations 450 and 460 might end the quiescent mode before the expiration of the quiescent time. This leads to the possibility that some network devices may still be in a low power mode and unable to hear any new polling signals sent out. In this case, the network may have to operate without all of its network devices being turned on. But if it has some devices operating, it can still pass some data.

Although operations 450, 460, and 470 are shown as being done in a particular order, this is by way of example only, and should not be considered limiting. In various embodiments these determinations can be done in any order, and can even be done in parallel.

In particular, a method of operating a network coordinator for a communications network is provided, comprising: operating the network coordinator in a polling mode; identifying a quiescent begin trigger indicating a start of a quiescent mode; operating the network coordinator in the quiescent mode after identifying the quiescent begin trigger; measuring an elapsed time since receiving the quiescent begin trigger as a quiescent time; and returning to operating the network coordinator in the polling mode based on a quiescent end indicator.

The quiescent begin trigger may be one of: receiving indications from all devices in the communications network that there is no data to be transmitted, receiving queue information from all the devices in the communications network that there is a certain minimum amount of data, none of which is time-critical, and receiving a request for quiescent mode from a source external to the communications network.

The quiescent end indicator may be one of: the quiescent time reaching a maximum quiescent duration, the network coordinator receiving a polling request, and the network coordinator identifying data to be sent to a remote device in the communications network. In particular, the quiescent end indicator may be the quiescent time reaching the maximum quiescent duration if the network coordinator does not receive the polling request before the quiescent time reaches the maximum quiescent duration, and the network coordinator does not identify data to be sent to the remote device before the quiescent time reaches the maximum quiescent duration.

The operating of the network coordinator in the polling mode may comprise: sending a polling signal over a transmission medium to a polled device chosen from a plurality of network devices; allocating sufficient channel time after the sending of the polling signal for the first network device to make a response to the polling signal; and repeating the operations sending and allocating a plurality of times, wherein the response to the polling signal is one of: sending a data transmission to a target device chosen from the plurality of network devices; or sending an acknowledgement signal to the network coordinator indicating that the polled device has no data to be sent, wherein each repetition of the operations of sending and allocating may change to a new polled device, and wherein each repetition of the operations of sending and allocating may change to a new target device.

The communications network may be a wireless network. And the method may be implemented in a semiconductor device.

Method of Operating a Network Device

FIG. 5 is a flow chart of the operation of a network device according to disclosed embodiments in which polling requests are allowed during a quiescent mode. As shown in FIG. 5, the network device begins by operating according to a polling scheme or polling mode (510).

During this polling mode the network device continually or periodically looks for an indicator (or trigger) to enter a quiescent mode (520). The quiescent begin indicator could be receiving a mode change signal (e.g., a shutdown signal) from the network coordinator; or it could be simply not receiving a polling signal for a certain period of time.

If the network device does not receive the indicator to enter the quiescent mode (520), it returns to operating according to the polling scheme (510) and monitoring for the quiescent mode indicator.

However, if the network device does receive the indicator to enter the quiescent mode (520), it starts a timer (530), enters into the quiescent mode (540) and begins to operate the network according to a quiescent scheme or a quiescent protocol. The quiescent mode could be a total shutdown of the device, a change to a different transmission protocol (e.g., a contention-based protocol such as ALOHA, slotted ALOHA, carrier sense multiple access, IEEE 802.11 type, or the like), or a partial shutdown of the device with some processing continuing during the quiescent mode.

In many embodiments the elapsing of a set time period in the quiescent mode will represent a maximum length of the quiescent mode. This will allow devices that do enter a low-power mode to know when to return to a polling mode without having to receive any external signals. In such an embodiment, the network device continually or periodically determines whether the quiescent mode has lasted for the entire quiescent time yet. (550). If it determines that the quiescent time has ended, the network device returns to the polling mode and again operates according to a polling scheme (510). If, however, the network coordinator determines that the quiescent time has not ended, processing continues.

If the quiescent time has not passed (550), the network device continually or periodically determines whether it has any data to send (560). If it does not have any data to send, the network device returns to determining whether the quiescent time has ended (550).

If, however, the network device does have data to send, it sends a polling request to the network coordinator (470), and then determines whether it has received a polling signal (480).

If the network device has received a polling signal, then it returns to the polling mode and operates itself according to the polling scheme again (510). If, however, it does not receive a polling signal within an acceptable amount of time, it simply returns to determining whether the quiescent time has elapsed (550) and considers the polling request a failure. In various embodiments the network device may attempt to send another polling request at a later time during the quiescent mode, or may simply wait until the quiescent mode ends and a new polling signal is received before trying to send the data.

Although operations 550 and the combination of operations 560 through 580 are shown as being done in a particular order, this is by way of example only, and should not be considered limiting. In various embodiments these determinations can be done in any order, and can even be done in parallel.

Figure 6:
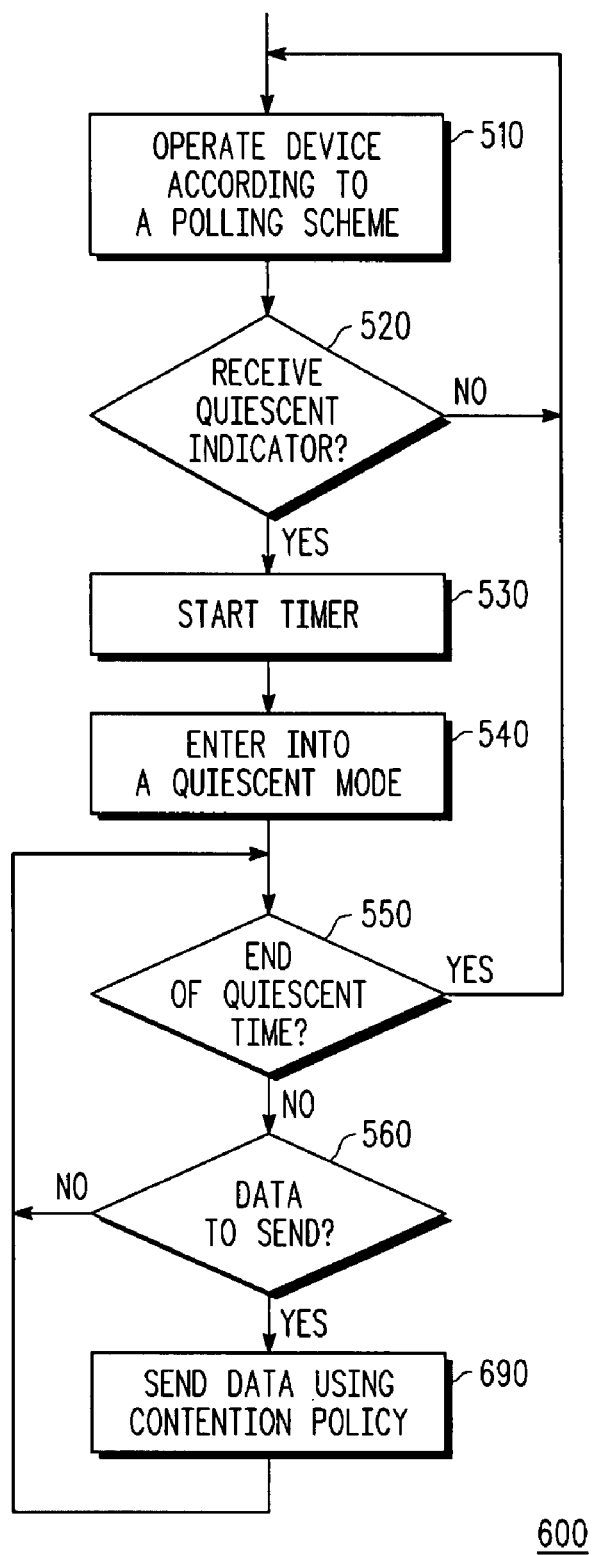
FIG. 6 is a flow chart of the operation of a network device according to disclosed embodiments in which contention-based transmissions are allowed during a quiescent mode.

FIG. 6 is a flow chart of the operation of a network device according to disclosed embodiments in which contention-based transmissions are allowed during a quiescent mode. The operation of a network device according to FIG. 6 is the same as according to FIG. 5, except for how the network device handles the situation where it has data to send during a quiescent mode.

In FIG. 6, operations 510, 520, 530, 540, 550, and 560 are performed as described above with respect to FIG. 5.

In this embodiment, however, if the network device determines that it does have data to send (560), it simply sends the data using a contention policy (690), without asking permission from the network coordinator. And when the data is sent using the contention policy, the network device returns to monitoring whether the quiescent time has elapsed (550). In alternate embodiments it may be possible to use a different transmission policy during the quiescent mode, aside from a polling protocol or a contention-based protocol.

Although operations 550 and the combination of operations 560 through 690 are shown as being done in a particular order, this is by way of example only, and should not be considered limiting. In various embodiments these determinations can be done in any order, and can even be done in parallel.

In addition, although FIGS. 5 and 6 show two alternate ways of a network device handling data to be transmitted that comes up during the quiescent mode, alternate embodiments could combine the two. For example, a network device could first send a polling request to transmit the data, and then, if that received no response, send the data using an alternate protocol, or vice versa.

In particular, a method of operating a local transceiver is provided, comprising: setting the local transceiver into an operational mode; operating the local transceiver using a polling protocol in the operational mode; receiving a quiescent begin indicator identifying a beginning of a quiescent mode; setting a portion of the local transceiver into a low power consumption operation in response to the quiescent begin indicator; measuring an elapsed time since receiving the quiescent begin indicator as a quiescent time; and returning the portion of the local transceiver to the operational mode based on a quiescent end indicator. The portion of the local transceiver may be a receiver portion.

The portion of the local transceiver may be turned off during the low power consumption operation. The quiescent end indicator may be the quiescent time reaching a maximum quiescent duration. The quiescent end indicator may also be the local transceiver identifying data to be sent to a remote transceiver.

The method may further comprise operating the local transceiver using the polling protocol after the quiescent time reaches the maximum quiescent duration.

The method may further comprise: sending a polling request to a network coordinator after the local transceiver identifies data to be sent, but before the quiescent time reaches a maximum quiescent time; and operating the local transceiver using the polling protocol after sending the polling request.

The method may further comprise: operating the local transceiver using a contention protocol after returning the receiver to the operational mode, but before the quiescent time reaches a maximum quiescent time; and operating the local transceiver using the polling protocol after the quiescent time reaches the maximum quiescent time. The contention protocol may be one of: an ALOHA protocol, a slotted ALOHA protocol, and a carrier sense multiple access protocol.

The operating of the local transceiver using a polling protocol may comprise: monitoring a transmission medium for a polling request; receiving the polling request identifying the local transceiver and indicating a set of transmission parameters for the transceiver; sending data over the transmission medium based on the set of transmission parameters if the local transceiver has data to send; sending a signal over the transmission medium indicating that there is no need for data transmission if the local transceiver has no data to send; and repeating the operations of monitoring, receiving, sending data, and sending the signal a plurality of times.

The local transceiver may be a wireless transceiver. And the method may be implemented in a semiconductor device.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method of operating a local transceiver, comprising:
   operating the local transceiver using a polling protocol;
   receiving a quiescent begin indicator identifying a beginning of a quiescent mode after operating the local transceiver using the polling protocol;
   setting a portion of the local transceiver into a low power consumption operation in response to the quiescent begin indicator;
   measuring an elapsed time since receiving the quiescent begin indicator as a quiescent time;
   sending a polling request before the quiescent time reaches a maximum quiescent time;
   operating the local transceiver using a contention protocol after sending the polling request, and after waiting a polling time without response, but before the quiescent time reaches the maximum quiescent time; and
   operating the local transceiver using the polling protocol after the quiescent time reaches the maximum quiescent time,
   wherein the contention protocol is one of: an ALOHA protocol, and a slotted ALOHA protocol.

2. The method of claim 1, wherein the portion of the local transceiver is a receiver portion.

3. The method of claim 1, wherein the portion of the local transceiver is turned off during the low power consumption operation.

4. The method of claim 1, wherein the quiescent end indicator is the quiescent time reaching a maximum quiescent duration.

5. The method of claim 3, further comprising operating the local transceiver using the polling protocol after the quiescent time reaches the maximum quiescent duration.

6. The method of claim 1,
   wherein
   the polling request is sent to a network coordinator after the local transceiver identifies data to be sent, but before the quiescent time reaches a maximum quiescent time;
   the method further comprising
   operating the local transceiver using the polling protocol after sending the polling request, and before the polling time expires.

7. The method of claim 1, wherein the operating the local transceiver using a polling protocol comprises:
   monitoring a transmission medium for a polling signal;
   receiving the polling signal identifying the local transceiver and indicating a set of transmission parameters for the transceiver;
   sending data over the transmission medium based on the set of transmission parameters if the local transceiver has data to send;
   sending a signal over the transmission medium indicating that there is no need for data transmission if the local transceiver has no data to send; and
   repeating the operations of monitoring, receiving, sending data, and sending the signal a plurality of times.

8. The method of claim 1, wherein the local transceiver is a wireless transceiver.

9. The method of claim 7, wherein the transmission medium is an optical medium.

10. The method of claim 1, wherein the method is implemented in a semiconductor device.

* * * * *